United States Patent
Rossi et al.

(10) Patent No.: US 10,908,962 B1
(45) Date of Patent: Feb. 2, 2021

(54) SYSTEM AND METHOD TO SHARE GPU RESOURCES

(71) Applicant: Apple Inc., Cupertino, CA (US)

(72) Inventors: Francesco Rossi, Sunnyvale, CA (US); Kutty Banerjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 15/944,062

(22) Filed: Apr. 3, 2018

Related U.S. Application Data (60) Provisional application No. 62/518,346, filed on Jun. 12, 2017.

(51) Int. Cl.
| | |
|---|---|
| *G06F 9/50* | (2006.01) |
| *G06F 9/54* | (2006.01) |
| *G06F 9/451* | (2018.01) |
| *G06F 17/15* | (2006.01) |
| *G06T 1/20* | (2006.01) |

(52) U.S. Cl.
CPC .......... *G06F 9/5027* (2013.01); *G06F 9/451* (2018.02); *G06F 9/546* (2013.01); *G06F 17/15* (2013.01); *G06T 1/20* (2013.01)

(58) Field of Classification Search
CPC ........ G06F 9/5027; G06F 9/546; G06F 17/15; G06F 9/451; G06T 1/20
See application file for complete search history.

(56) References Cited

U.S. PATENT DOCUMENTS

| | | |
|---|---|---|
| 2009/0160867 A1 | 6/2009 | Grossman |
| 2014/0022266 A1 | 1/2014 | Metz |
| 2016/0062947 A1 | 3/2016 | Chetlur |
| 2016/0249079 A1 | 8/2016 | Malone |
| 2018/0315158 A1* | 11/2018 | Nurvitadhi ................ G06T 1/20 |
| 2019/0073583 A1* | 3/2019 | Chen .................... G06F 13/362 |

* cited by examiner

*Primary Examiner* — Sisley N Kim
(74) *Attorney, Agent, or Firm* — Blank Rome LLP (57) ABSTRACT

The embodiments disclosed herein relate to the field of graphics processing and, without limitation, to techniques to enable efficient sharing of a graphics processing unit (GPU) between user interface (UI) graphics operations and intense compute operations. In certain embodiments, intense compute operations, such as long accumulations, are divided into multiple pieces. A scheduler is added to force context switching if an intense compute operation is blocking timely execution of a UI graphics operation. The division of the intense compute operation is tuned so that the GPU compute queue can drain during approximately the same time required to perform a context switch on the GPU.

17 Claims, 10 Drawing Sheets

| 370 APPLICATION A | 371 PHOTOS | 372 QUICKEN | 373 IMOVIE | 374 APPLICATION B |
|---|---|---|---|---|
| 360 OTHER APPLICATION SERVICES | 361 SPRITE KIT | 362 SCENE KIT | 363 CORE ANIMATION | 364 CORE GRAPHICS |
| 350 O/S SERVICES | 351 OPENGL OR OPENCL | 352 METAL | 353 USER MODE DRIVERS | 354 SOFTWARE RASTERIZER |
| O/S KERNEL 345 | | | | |
| HARDWARE 340 | | | | |

SYSTEM AND METHOD TO SHARE GPU RESOURCES

BACKGROUND

Graphics processing units (GPUs) have become important for processing data-parallel graphics tasks. Both graphics and non-graphics data-parallel tasks can be handled by GPUs, taking advantage of their massive parallel capabilities. In some instances, tasks presented to the GPU may be computationally intense in that they require relatively long time periods of execution. One example of a computational function that may produce these types of intense GPU tasks is convolutional neural network ("CNN") software. While the issue may be present for any type of software or user function, CNNs are commonly employed in artificial intelligence tasks such augmented reality, virtual reality, image recognition, scene recognition, and facial recognition.

Given the computational intensity of these CNNs and similarly computationally intense functions, there is a tendency to use a server or other high power cloud based platform to augment the local computing power of computing devices such as cell phones, tablets, or any number of Internet connected smart devices (e.g., the Internet of Things, IoT). Many of these intense functions are well suited for processing on programmable GPUs that are embedded in cell phones and other smart devices. However, due at least to user demands, the computing devices must continually render graphics for display on the computer's interface. For example, cell phones and tablets continually render graphics under the users control and those graphics increasingly involve 3D rendering, which is resource intensive compared with many other system operations.

In order to limit or avoid using cloud-based resources for intense computations, programmers may rely on GPU functionality. As a result, in a given system having a given GPU resource, both graphics (e.g., user interface) operations and other computationally intense operations (e.g., compute operations resulting from CNNs) may rely on that GPU resource for processing. Thus, there may be a competition for a GPU resource in attempting to perform both graphics/user interface ("UI") operations and other intense computations. As an example, sometimes, if the GPU resource is shared, operations that are not associated with UI graphics may block user interface related operations, causing frame drops or other noticeable disturbances to the display.

SUMMARY

Many embodiments disclosed herein relate to the field of graphics processing and, particularly, to the use of a GPU to perform both UI 3D graphics operations concurrently with time consuming compute operations on a mobile device without accessing cloud computing resources. In some embodiments, functionally interesting features such as scene recognition, facial recognition, augmented reality, or virtual reality involve CNNs, which require intense accumulation mathematics. While GPUs are well suited for these mathematics through the GPU compute functionality, the length and intensity of the accumulations may tie up the GPU so long that UI graphics cannot be processed timely to update the display.

In some embodiments of the disclosure, application or framework software divides the accumulations into multiple pieces so that no one piece is very large. In addition, a scheduling mechanism is implemented in front of the GPU so that the accumulation compute operations cannot prevent the UI graphics operations from timely running. In particular, in these embodiments, the scheduler detects UI graphics operations before they reach the GPU and issues a context switch request so that any pending accumulation compute operations may drain from the GPU compute queue while pre-processing is being performed on the detected UI graphics operations.

In some embodiments, the division of the accumulation operation along with other considerations helps ensure that there is never so much work in the GPU compute queue that it cannot drain in approximately the same period of time required for the GPU to complete its context switch.

DETAILED DESCRIPTION

This disclosure pertains to systems, methods, and computer readable media to improve the operation of graphics systems, and in varying embodiments improve the operation of computing systems by more efficiently allowing sharing of the system's GPU resources. It also pertains to a variety of architectures for design and/or operation of a graphics system starting with an application program and extending to rendering of content or processing of compute tasks by a processing resource, such as a GPU. In general, many embodiments of the invention envision a system that allows for sharing GPU resources between high priority tasks such as UI graphics and lower priority tasks, such as intense compute operations.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, leaving resorting to the claims as a potential necessity to determine such inventive subject matter. Reference in this disclosure to "one embodiment" or to "an embodiment"

or "embodiments" means that a particular feature, structure, or characteristic described in connection with the embodiment is included in at least one embodiment of the disclosed subject matter, and multiple references to "'one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of graphics systems such as systems employing GPUs for both UI and compute operations.

Exemplary Hardware and Software

The inventive embodiments described herein may have implication and use in and with respect to all types of devices, including single- and multi-processor computing systems, and vertical devices (e.g., cameras, gaming systems, appliances, etc.) that incorporate single- or multi-processing computing systems. The discussion herein is made with reference to a common computing configuration that may be discussed principally as an end user system. This common computing configuration may have a CPU resource including one or more microprocessors and a graphics processing resource including one or more GPUs. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software-operating environment is discussed below. While the focus of many embodiments relates to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 1:
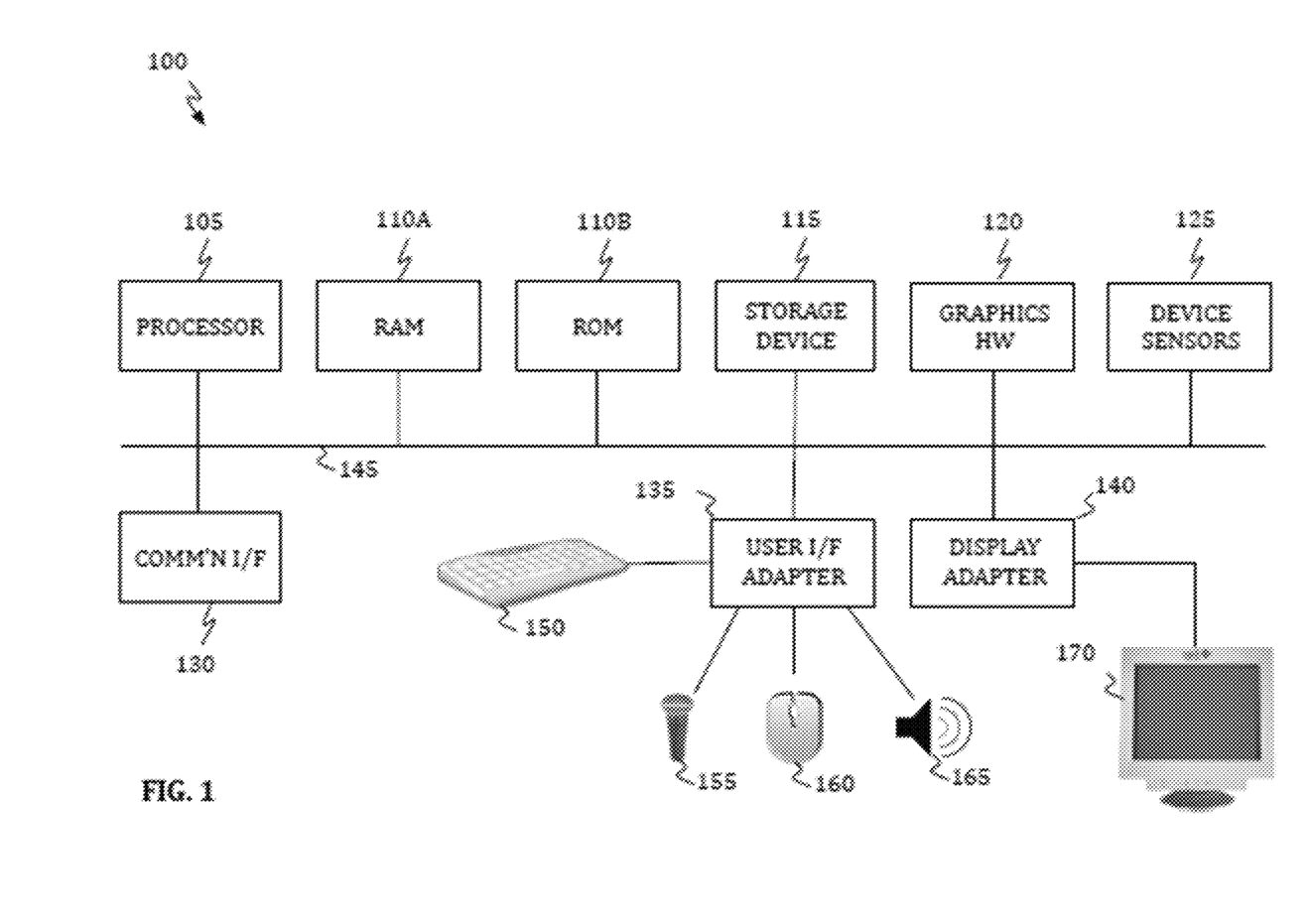
FIG. 1 shows a representative computer node that may be used, for example, as an end-user machine or a developer machine.

Referring to FIG. 1, the disclosed embodiments may be performed by representative computer system 100. For example the representative computer system may act as an end-user device or any other device that produces or displays graphics. System 100 may be embodied in any type of device, such as a general purpose computer system, a television, a set top box, a media player, a multi-media entertainment system, an image processing workstation, a hand-held device, or any device that may be coupled with or may incorporate display or presentation devices as discussed herein. Computer system 100 may include one or more processors 105, memory 110 (110A and 110B), one or more storage devices 115, and graphics hardware 120 (e.g., including one or more GPUs). Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infra-red sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus, backplane, fabric or network 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120, such computer program code may implement one or more of the methods or processes described herein. In addition, the system may employ microcontrollers (not shown), which may also execute such computer program code to implement one or more of the methods or computer readable media claims illustrated herein. In some embodiments, the microcontroller (s) may operate as a companion to a GPU or CPU resource.

Communication interface 130 may include semiconductor-based circuits and may be used to connect computer system 100 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Apple lightning, Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.) User interface adapter 135 may be used to connect keyboard 150, microphone 155, pointer device 160, speaker 165, and other user interface devices such as a touchpad and/or a touch screen (not shown). Display adapter 140 may be used to connect one or more display units 170.

Processor 105 may execute instructions necessary to carry out or control the operation of many functions performed by system 100 (e.g., evaluation, transformation, mathematical computation, or compilation of graphics programs, etc.). Processor 105 may, for instance, drive display 170 and receive user input from user interface adapter 135 or any other user interfaces embodied by a system. User interface adapter 135, for example, can take a variety of forms, such as a button, a keypad, a touchpad, a mouse, a dial, a click wheel, a keyboard, a display screen, and/or a touch screen. Processor 105 may be any type of computing device, such as one or more microprocessors working alone or in combination with one or more GPUs, DSPs, microcontrollers, or system-on-chip devices such as those found in some mobile devices. Processor 105 may include one or more dedicated GPUs or graphics subsystems that accept program instructions to create or alter display information, such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more discrete programmable GPUs. System 100 (implementing one or more embodiments discussed herein) can provide the means for one or more users to control the same system (e.g., system 100) or another system (e.g., another computer or entertainment system) through user activity, which may include audio instructions, natural activity, and/or pre-determined gestures such as hand gestures.

Various embodiments of the invention may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible resources (e.g., cloud servers accessed over the Internet).

Returning to FIG. 1, device sensors 125 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network. Memory 110 may include one or more different types of media used by processor 105, graphics hardware 120, and device sensors 125 to perform device functions. Storage 115 may store data such as media (e.g., audio, image, and video files); metadata for media; computer program instructions; graphics programming instructions and graphics resources; and other software, including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, a microcontroller, GPU or processor 105, such computer program code may implement one or more of the acts or functions described herein (e.g., interpreting and responding to user activity including commands and/or gestures).

Figure 2:
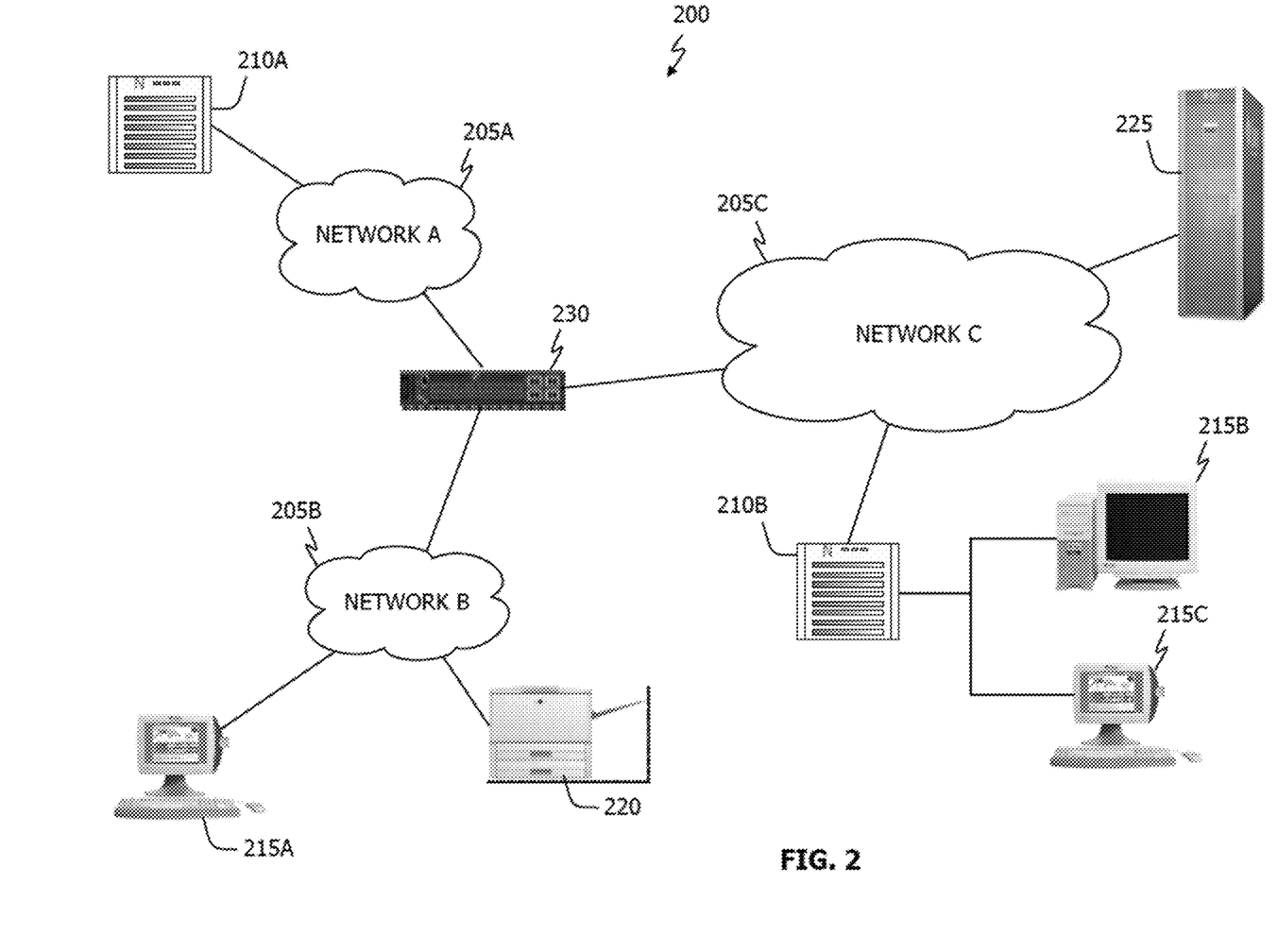
FIG. 2 shows an illustrative network environment associated with embodiments of the disclosure.

FIG. 2 depicts illustrative network architecture 200, within which the disclosed techniques may be implemented and the disclosed hardware may reside. This illustrative network 200 may include a plurality of networks 205, (e.g., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (e.g., 210A and 210B) that are capable of operating server applications such as databases and also capable of communicating over networks 205. One embodiment using server computers may involve the operation of one or more central systems to process graphics information and distribute the processed information to nodes on a network for display.

Client computers 215 (e.g., 215A, 215B, and 215C), which may take the form of any smartphone, gaming system, tablet, computer, set top box, entertainment device/system, television, telephone, communications device, IoT device, or intelligent machine, including embedded systems, may also be coupled to networks 205, and/or data server computers 210. In some embodiments, network architecture 200 may also include network printers such as printer 220 and storage systems such as 225, which may be used to store multi-media items or other data that are referenced herein. To facilitate communication between different network devices (e.g., data servers 210, end-user computers 215, network printer 220, and storage system 225), at least one gateway or router 230 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including, but not limited to, PANs, LANs, WANs, and cellular networks).

As noted above, embodiments of the inventions disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 395 illustrating hardware 340, which may include memory, CPUs, GPUs, microcontrollers, or other processing and/or computer hardware such as memory controllers and specialized hardware. Above the hardware layer is the O/S kernel layer 390 showing an example as O/S kernel 345, which is kernel software that may perform memory management, device management, and system calls. The kernel layer is the typical location of hardware drivers, such as a GPU driver. The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer exemplified by O/S services 350. O/S services may provide core O/S functions in a protected environment. In addition, O/S services shown in layer 385 may include frameworks for OpenGL/OpenCL 351 CUDA® or the like, Metal 352, user mode drivers 353, and a Software Rasterizer 354. (CUDA is a registered trademark of NVIDIA Corporation.) While most of these examples all relate to GPU processing or graphics and/or graphics libraries, other types of services are contemplated by varying embodiments of the disclosure. These particular examples also represent graphics frameworks/libraries that may operate in the lower tier of frameworks, such that developers may use shading and graphics primitives and/or obtain fairly tightly coupled control over the graphics hardware. In addition, the particular examples named in FIG. 3 may also pass their work product on to hardware or hardware drivers, such as the GPU driver, for display-related material or compute operations.

Referring again to FIG. 3, OpenGL®/OpenCL® 351 represent examples of well-known libraries and application programming interfaces for GPU compute operations and graphics rendering including 2D and 3D graphics. (OPENGL is a registered trademark of Silicon Graphics International Corporation. OPENCL is a registered trademark of Apple Inc.) Metal 352 also represents a published graphics library and framework, but it is generally considered lower level than OpenGL 351, supporting fine-grained, low-level control of the organization, processing, and submission of graphics and computation commands, as well as the management of associated data and resources for those commands. User mode drivers 353 is software relating to the control of hardware that exists in the user space for reasons that are typically related to the particular device or function. In many embodiments, user mode drivers work cooperatively with Kernel drivers and/or firmware to perform the overall function of a hardware driver. Software Rasterizer 354 refers generally to software used to make graphics information such as pixels without specialized graphics hardware (e.g., using only the CPU). These libraries or frameworks shown within the O/S services layer 385 are only exemplary and intended to show the general level of the layer and how it relates to other software in a sample arrangement (e.g., kernel operations usually below and higher-level Applications Services 360 usually above). In addition, it may be useful to note that Metal 352 represents a published framework/library of Apple Inc. that is known to developers in the art. Furthermore, OpenGL/OpenCL 351 may represent frameworks/libraries present in current versions of software distributed by Apple Inc.

Figure 3:
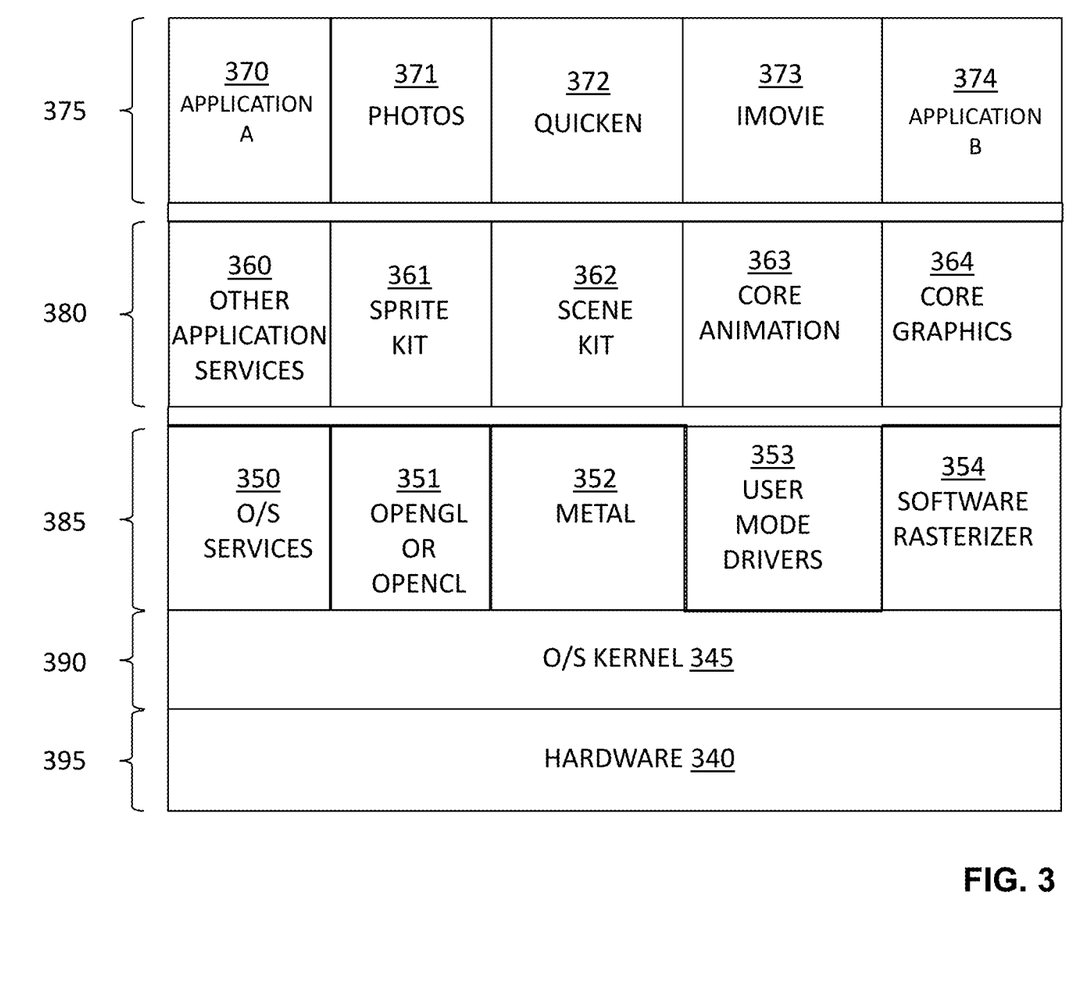
FIG. 3 shows an illustrative software layer and architecture diagram.

Above the O/S services layer 385 there is an Application Services layer 380, which includes Sprite Kit 361, Scene Kit 362, Core Animation 363, and Core Graphics 364. The O/S services layer represents higher-level frameworks that are commonly directly accessed by application programs. In some embodiments of this disclosure the O/S services layer includes graphics-related frameworks that are high level in that they are agnostic to the underlying graphics libraries (such as those discussed with respect to layer 385). In such embodiments, these higher-level graphics frameworks are meant to provide developer access to graphics functionality in a more user/developer friendly way and allow developers to avoid work with shading and graphics primitives. By way of example, Sprite Kit 361 is a graphics rendering and animation infrastructure made available by Apple Inc. Sprite Kit 361 may be used to animate textured images or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphics rendering and animation infrastructure made available from Apple Inc. Core Animation 363 may be used to animate views and other visual elements of an application. Core Graphics 364 is a two-dimensional drawing engine from Apple Inc., which provides 2D rendering for applications.

Above the application services layer 380, there is the application layer 375, which may comprise any type of application program. By way of example, FIG. 3 shows three specific applications: photos 371 (a photo management, editing, and sharing program), Quicken® 372 (a financial management program), and iMovie® 373 (a movie making and sharing program). (QUICKEN is a registered trademark of Intuit Inc. IMOVIE is a registered trademark of Apple Inc.) Application layer 375 also shows two generic applications 370 and 374, which represent the presence of any other applications that may interact with or be part of the inventive embodiments disclosed herein. Generally, some embodiments of the disclosure employ and/or interact with applications that produce displayable/viewable content or produce computational operations that are suited for GPU processing.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the disclosure may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure relate to the ability of applications in layer 375 or frameworks in layers 380 or 385 to divide long continuous GPU tasks into smaller pieces for reasons that will be explained later. In addition, many embodiments of the disclosure relate to graphics hardware (e.g., GPU) driver software in layer 390 and/or embodied as microcontroller firmware in layer 395; such drivers performing a scheduling function for the graphics resource (e.g., GPU).

No limitation is intended by these hardware and software descriptions and the varying embodiments of the inventions herein may include any manner of computing device, such as Macs, PCs, PDAs, phones, servers, or even embedded systems, such as a dedicated device.

Long Compute Operations

Using compute operations on a GPU has become relatively common place, at least in part because GPUs are highly efficient resources for data parallel operations. In addition, GPUs are also resources that are often unused or underused in systems because, if they are only used in their traditional role (to provide graphics processing), then when there is no UI activity, the GPUs are likely to be idle. Developers of GPUs, systems, and software have all recognized the benefits of increasing the use of this resource, which can occur in any number of ways, including by using the GPU for compute operations or by using the GPU to render or partially render graphics well before the graphics are required. However, since users notice whether or not a system's UI (e.g., display) is inadequately responsive or visually imperfect, in many embodiments of the disclosure, UI operations are considered higher priority than other GPU uses.

With the recent increases in the use of GPUs for compute operations, developers have recognized the efficiency of GPUs for performing computationally intense functions. Due to the intensity of the functions, in some instances, compute operations can form temporally lengthy tasks for the GPU resource. Temporally long operations become systemically interesting when they are continuous for material time periods because they can block access to the GPU at a critical or important moment in time (e.g., when a UI operation is pending). One example of a GPU compute operation requiring long continuous periods of GPU processing time is in the area of mathematics, such as CNNs. CNNs may be useful or required in learning or high intelligence operations, such image processing tasks like facial or scene recognition.

CNNs may require mathematical convolution operations, such as calculating an individual neuron's response to stimuli within its receptive area. The convolutional operations in CNNs often require a large amount of mathematical accumulation or summation, making the tasks difficult to break up or divide spontaneously in the context of computer computations. In other words, when a GPU is processing a long accumulation associated with a CNN (or other long continuous compute operations), the operation may not be easily terminable at any arbitrary point without losing all the work performed, and may not be terminable at all. Thus, in some embodiments, once a long continuous compute operation (such as a long accumulation associated with a CNN) begins, it may not be interrupted to allow for higher priority work to be processed. In the case of the GPU, the higher priority work may be UI graphics for which untimely processing will cause user-visible display issues.

A Sample Embodiment

Figure 4:
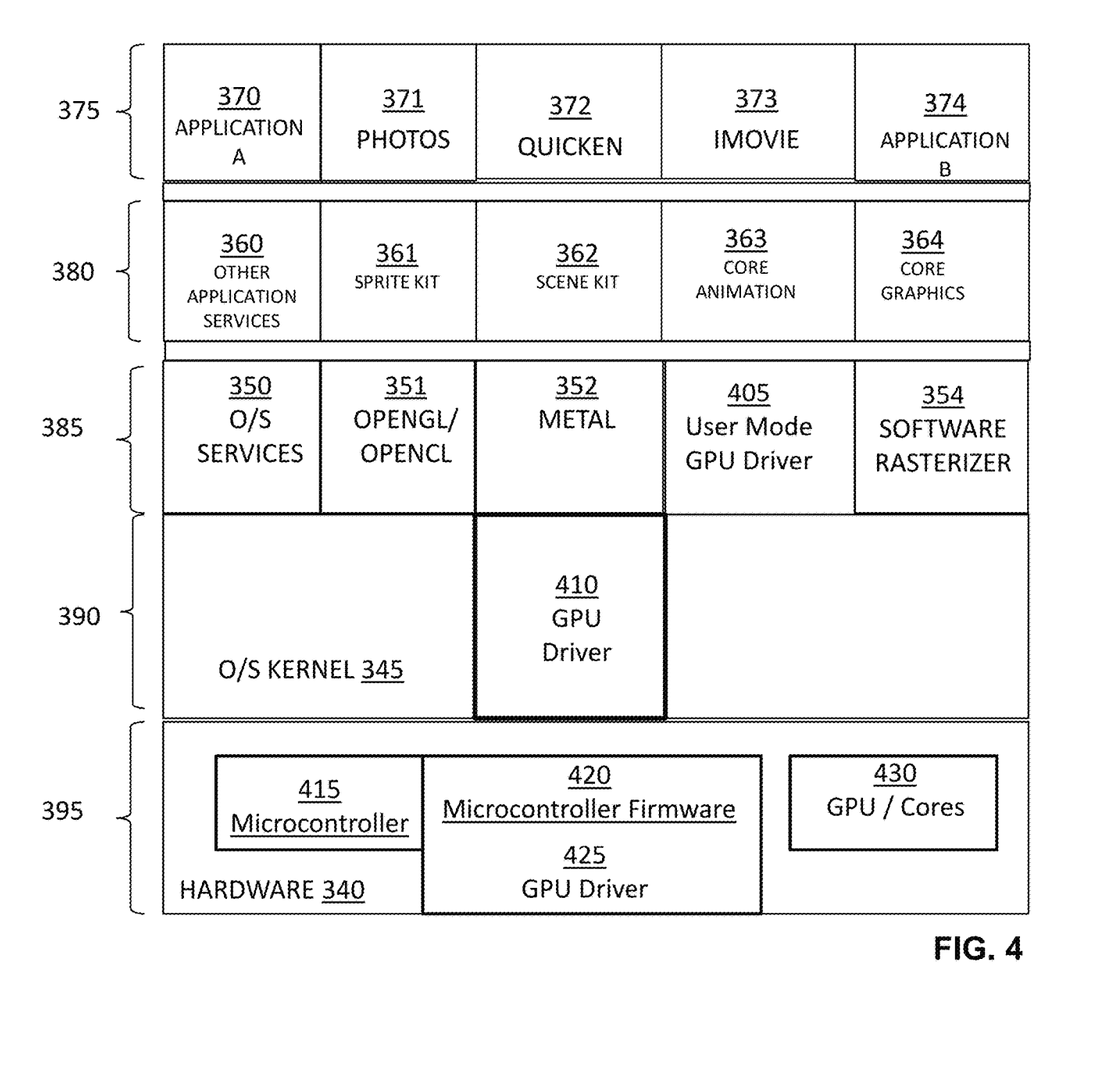
FIG. 4 shows a second software layer architecture, including certain hardware associated with some embodiments of the disclosure.

Referring to FIG. 4, there is shown a software architecture similar to the standard architecture shown in FIG. 3. By way of distinction, the architecture of FIG. 4 shows: a user mode GPU driver 405, instead of the generic user mode driver; a GPU driver 410 in the O/S kernel 345; a microcontroller 415, accompanied by firmware 420, including GPU driver firmware 425 in the hardware layer 340; and a GPU or GPU execution cores 430 in the hardware layer 340. The presence of multiple instances of a GPU driver (405 in user mode, 410 in the O/S kernel 345, and 425 in the microcontroller firmware 420) indicates the various options for implementing the GPU driver. As a matter of technical possibility any of the three shown drivers might independently operate as a sole GPU driver. In many embodiments of the disclosure, the overall GPU driver is implemented in a combination of GPU driver 410 and GPU driver 425 (e.g., in the O/S kernel and the microcontroller firmware). In other embodiments, the overall GPU driver may be implemented by the combined effort of all three shown drivers 405, 410, and 425.

In some embodiments of the disclosure, a comprehensive system and software are proposed for efficiently sharing a GPU resource 430 between high priority GPU operations (e.g., UI graphics) and lower priority operations (e.g., long continuous compute operations). In one or more embodiments, there are two primary aspects. The first aspect arises from the user space (layers 385, 380, and 375), where GPU operations originate. For example, in performing facial or scene recognition, the photos application 371 may employ a CNN, which would create long continuous GPU operations in the form of accumulations and or summations. In one or more embodiments, the photos application 371 breaks the long continuous GPU operations into multiple pieces in a manner discussed later. As explained more fully later, the smaller pieces allow for more efficient sharing of the GPU resource because, when the smaller pieces are queued in the GPU, they can drain faster during a context switch. In an alternative embodiment, the photos application 371 may issue long continuous GPU operations, but have those operations broken into multiple pieces by a lower-level framework being used to access the system's graphics resource. For example, applications services 360 may be a high-level framework to support mathematical functions. The photos application 371 may make a request for a long continuous GPU operation (e.g., associated with a CNN) to the mathematical function framework 360, where the long continuous operation is broken down into multiple pieces. In this manner, any process in user space may be used to break down the long continuous GPU operations. In addition, in some embodiments the GPU user space driver 405, and/or the GPU O/S kernel driver 410 may wholly or partially break the long continuous GPU operation into multiple segments.

The second aspect of the embodiments discussed above relates to the GPU driver. In particular, in one or more embodiments, the GPU driver may implement a scheduler that provides for prioritization between GPU operations. For example, the scheduler may prioritize UI graphics operations over lower priority operations, such as long continuous compute operations. In some embodiments, the scheduler is implemented in microcontroller firmware 420, and in some of those embodiments, it is implemented as part of the GPU driver 425. As an example, many of these embodiments use a microcontroller 415 to pre-process GPU command streams, and the microcontroller 415 can be also be used to implement the scheduler. In some embodiments, the microcontroller 415 is embedded in the same package with the GPU 430 and in other embodiments the microcontroller 415 is physically separate from form GPU 430 and/or physically discrete.

As mentioned above, in many embodiments, the scheduler functionality and/or logic is implemented in a GPU driver. In at least one of those embodiments the entire driver or a portion of the driver where the scheduling logic is implemented resides in the microcontroller firmware 420 (shown as GPU driver 425). In other embodiments, the scheduler runs in the O/S kernel (e.g., as part of GPU driver 410) where it is processed by the CPU rather than microcontroller 415.

Sharing the GPU Between Compute and UI Operations

Figure 5A:
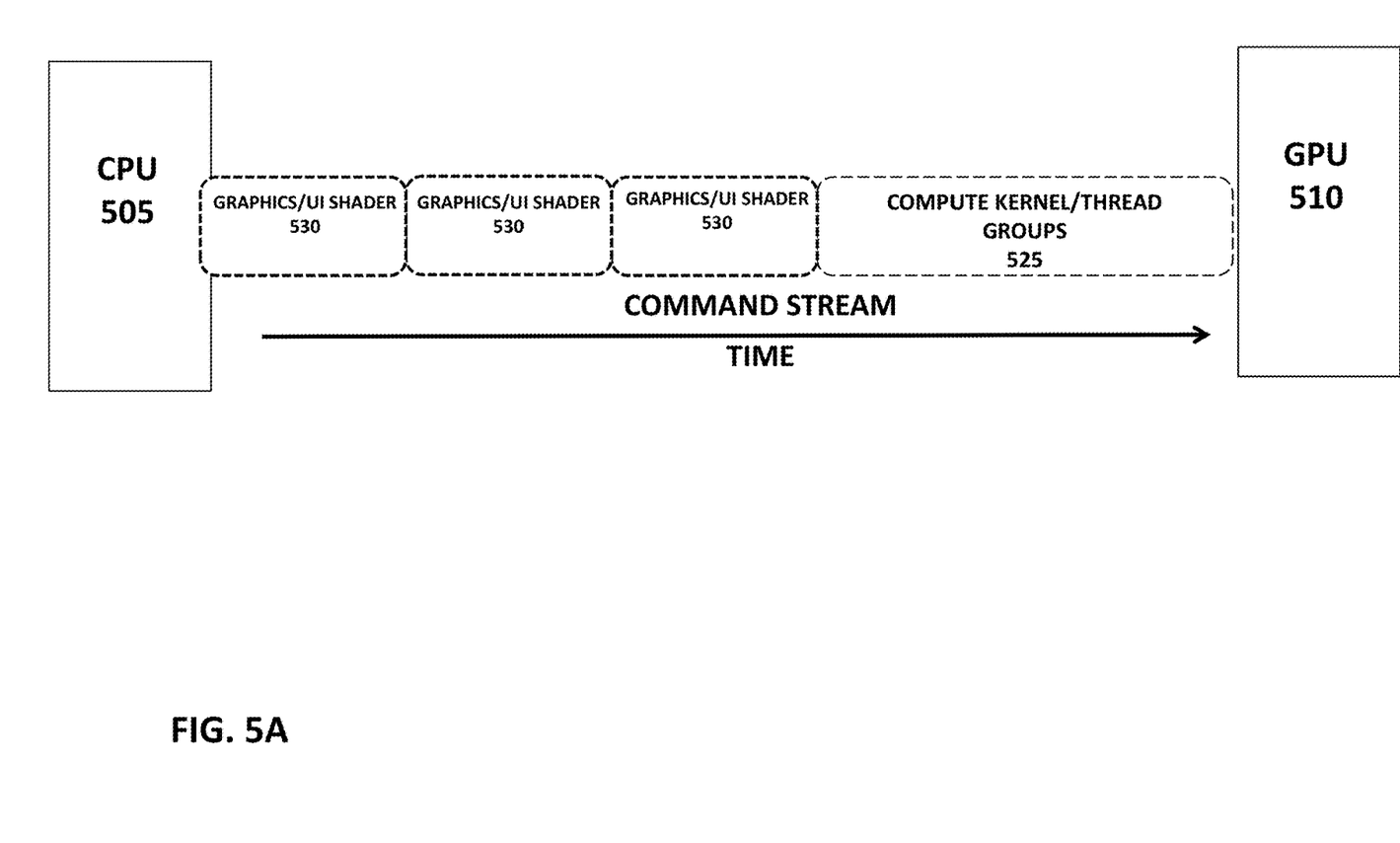
FIG. 5A shows the progress of a command stream between the CPU and GPU in accordance with one or more embodiments.

With reference to FIG. 5A, many embodiments of the disclosure seek to share a system's GPU processing resources between compute operations and graphic operations, which support the UI. As shown in FIG. 5A, in one or more embodiments, the application and/or framework software running on a system employ the GPU by creating command streams, which include a flow of commands submitted by a system's CPU resource (e.g. CPU 505) to a system's graphics processing resource (e.g. GPU 510). A long continuous operation, such as compute operation 525, may occupy the GPU for a disproportionate amount of time (indicated by the linear size of compute operation 525), and thereby block UI graphics operations 530, potentially causing a frame drop or other anomaly in the UI presentation.

Figure 5B:
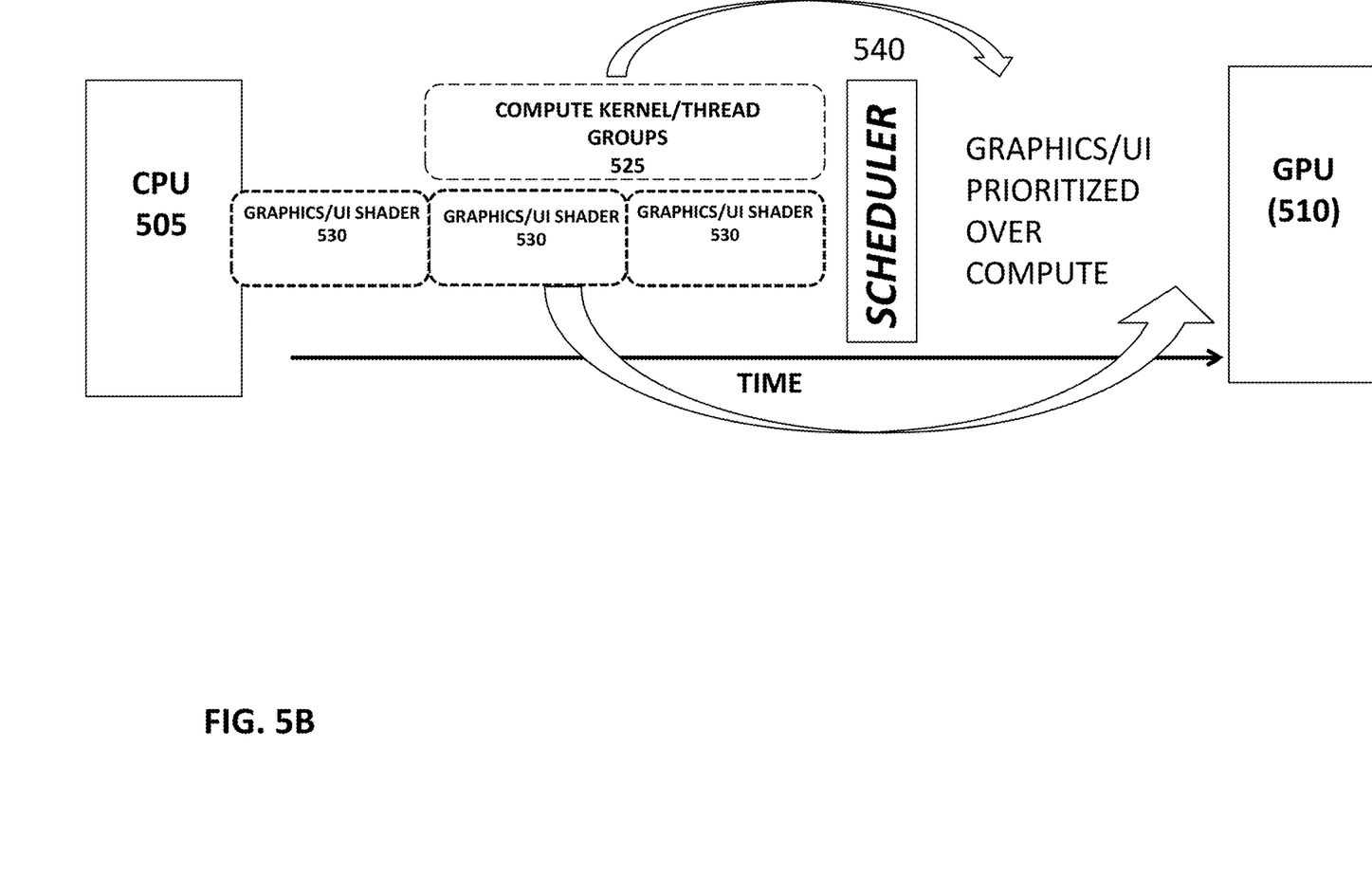
FIGS. 5B and 5C show the progress of a command stream between the CPU and GPU where scheduling is employed in accordance with some embodiments.

At least because users may notice interruption to the UI, in some embodiments, the GPU work relating to UI operations may be prioritized over non-UI operations, such as long continuous compute operations. With reference to FIG. 5B, there is shown a command stream submitted by CPU 505 to GPU 510, however, with a scheduler or scheduling logic 540 intervening. As discussed above, in some embodiments, scheduler 540 is implanted as software running on a microcontroller functionally close to or embedded with GPU 510. However, there are alternatives for implementation as discussed above, as well as in pure hardware or any hybrid combination of hardware and software. Scheduler 540 can enforce priorities and therefore allow higher priority operations, such as UI graphics to execute timely even when the GPU is shared with other operations, such as compute operations. However, depending on the pipelining and queuing characteristics of any particular GPU, simplistic forms of prioritization may be inadequate. For example, if a long continuous GPU operation (such as a large accumulation associated with a CNN) begins to execute and fills the GPU queue, the GPU may be unable to drain the queue timely in order to execute a needed operation, such as UI graphics. In other words, even if the scheduler 540 always advances a pending UI graphics operation (e.g. high priority) before any compute operation (e.g. lower priority), once the compute is allowed and fills the queue, it may not be able to complete (e.g., drain) in time for the next needed UI graphics operation, which may not even arise until after the compute begins to execute. While this is explained in greater detail later, in some embodiments, this is the reason that it may be useful to break down a long continuous GPU operation into multiple pieces—in particular multiple pieces designed to fill the GPU queue such that it has a maximum drain time that is tolerable to the local UI operations.

Figure 5C:
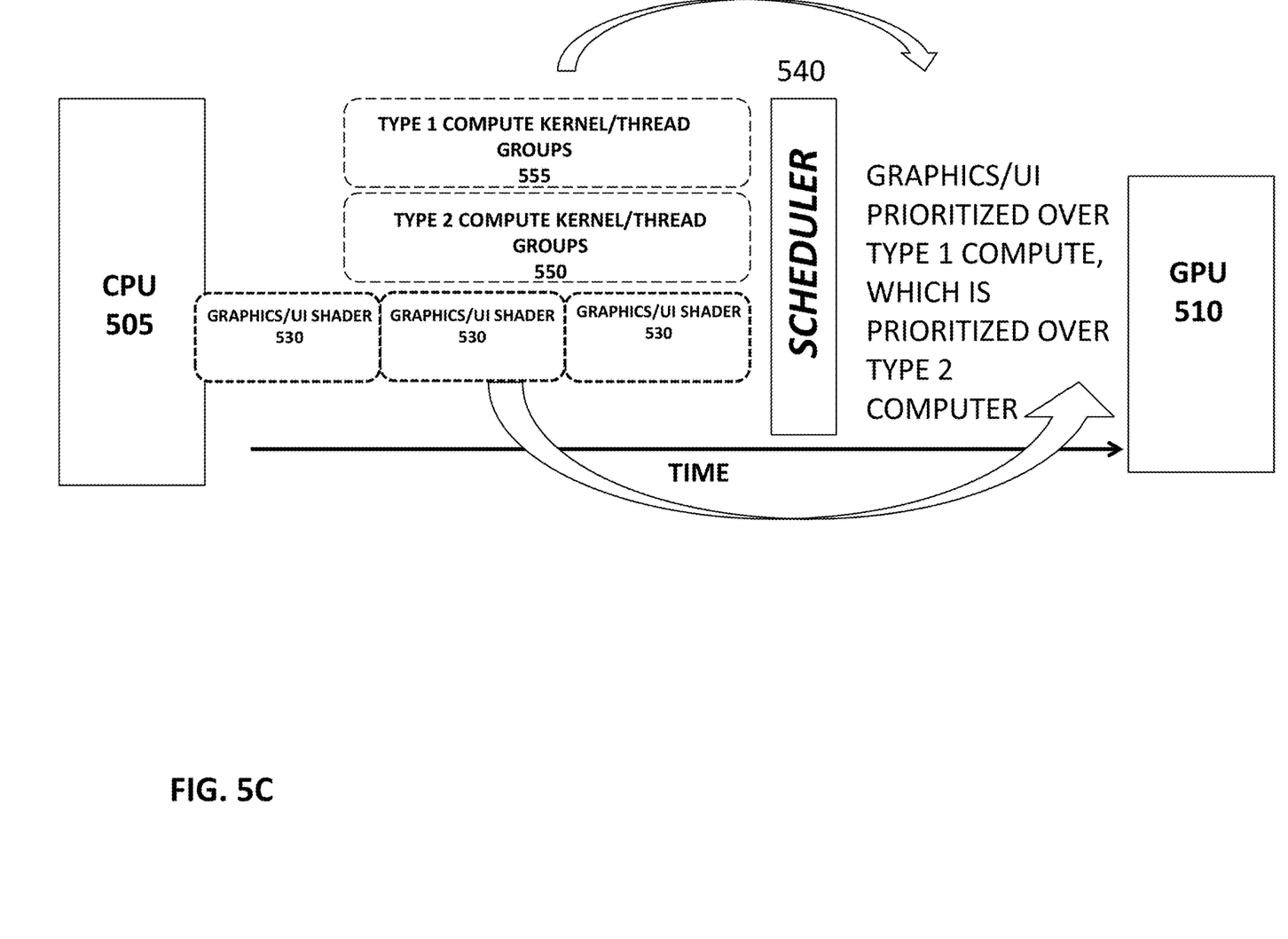

With reference to FIG. 5C, there is shown an illustrative embodiment to demonstrate the flexibility of certain embodiments of the disclosure. In particular, varying of these embodiments allows all types of prioritization. As shown in FIG. 5C, scheduler 540 may provide prioritization between multiple types of compute operations 550 and 555 (e.g. prioritizing augmented reality compute operations over operations originating from photo facial recognition). Similarly, but not illustrated, the scheduler 540 may provide prioritization between types of graphics operations (e.g. those for immediate use on the UI verses others). One or more embodiments of the disclosure also allow for prioritization according to software that originated the request (e.g. a registered specific application, etc.); a function that originated the request (e.g. facial recognition, scene recognition, augmented reality, or virtual reality); a type of software that originated the request (e.g. application or framework); system status, including resource availabilities such as memory and available CPU or GPU processors; or any combination of the foregoing. In varying embodiments, priorities may be assigned by the GPU driver or other software associated with the scheduler implementation.

Queueing and Draining

Figure 6:
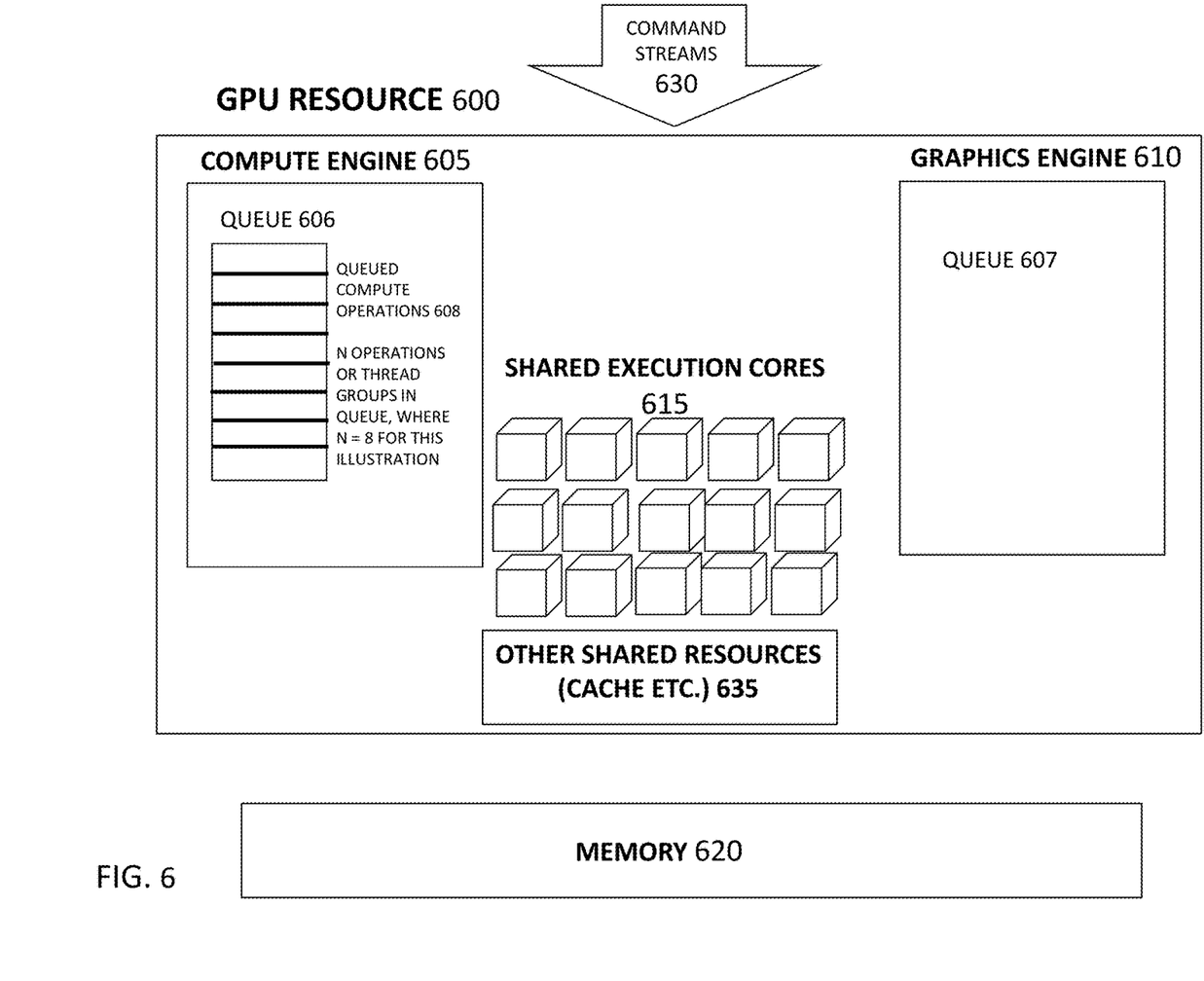
FIG. 6 shows an illustrative hardware architecture in accordance with one or more embodiments.

With reference to FIG. 6, there is shown a GPU resource 600, including a single GPU having a compute engine 605 and a graphics engine 610, which may be a 3D graphics engine in many embodiments. In some embodiments, command streams 630 are pre-processed by a microcontroller (415, but not shown here) and sorted to the correct engine 605 and 610. In most embodiments, compute engine 605 operates entirely or materially (for purposes of this discussion) independent of graphics engine 610. However, in most embodiments, the processing of compute operations is not independent of graphics operations because the GPU 600 has many shared resources, such as execution cores 615 (which may be far more numerous than shown), and other shared resources 635 such as cache memory and sometimes external memory space 620 (which is system main memory in some embodiments). Each of the compute engine 605 and the graphics engine 610 have a command queue. Relevantly, in many embodiments, the compute engine command queue 606 holds a quantity of N operations, which in many embodiments are equated to thread groups. For full context of vocabulary, a GPU program may include multiple compute kernels, where each compute kernel may include multiple thread groups. Furthermore, in most embodiments, a thread group is the smallest quantum of work that may be passed to the GPU. Importantly, this disclosure uses the word "kernel" in two different ways because it is a homonym: an operating system kernel is the core of an operating system, where drivers typically execute; and a compute kernel is a GPU program or portion thereof. Skilled artisans will understand from context which usage is employed.

Returning now to FIG. 6, the value of the number N varies according to the specific hardware. For queue 606, N=8 as illustrated. However, different GPUs or processing configurations may have values for N that are larger or smaller than GPU 600 and queue 606. In many embodiments, queue 606 may hold N operations, where each operation refers to a thread group. Importantly, in many embodiments N refers to the number of operations/thread groups that cannot be stalled or retrieved once queued. In other words, for those embodiments, once the 8 queue spots are full, they must be drained before any of the shared resources may be used for work originating from graphics engine 610. This situation is particularly impactful on a context switch, where the system attempts to stop lower priority (e.g. compute) operations so that higher priority (e.g. UI graphics) operations may be processed. Thus, if at the time of the context switch, the work in the queue 606 has too long a latency to drain, the actual context switch will be delayed for the full latency and important graphics operations from graphics engine 607 may not timely reach the execution cores 615.

In one or more embodiments, in order to make the GPU available to a higher priority command, the drain latency of the queue (e.g. 606) is kept below or close to the GPU context switch latency. For example, if the context switch latency of the GPU equals 10 milliseconds, then at relevant times the drain latency of the queue (e.g. 606) is maintained at approximately 10 milliseconds or less. The value is approximate because, while it is not ideal for drain latency to exceed context switch time, it may be allowed by design where it is determined that such exceeding behavior will not cause any disruption of the display or unacceptable disruption of the display.

As explained in more detail below, in order to keep the drain latency down, applications or other user level software generating the long compute operations can divide those operations so as to suit the needed criteria. For example, long accumulates resulting from CNN functionality may be divided into multiple pieces so that N thread groups (whatever N is for a given specific hardware configuration) will drain from the queue in approximately the context switch time of the specific hardware or less.

Breaking Up Compute Operations

As discussed above, mixing long continuous GPU operations (such as large accumulations) with high priority operations (such as UI 3D operations) presents opportunities for disrupted UI or other harmful consequences for failing to timely execute high priority GPU operations. In many embodiments, this is because the GPU driver cannot interrupt the queued thread groups when higher priority (e.g., UI 3D) work arrives. Thus, the higher priority (e.g., UI 3D) work may be delayed too long because the driver cannot start the UI work until all the queued work is completed.

As discussed above, in order to mitigate this issue, some embodiments contemplate dividing or partitioning the lower priority operations at the application or framework stage in order to make the work more friendly to the higher priority GPU work—e.g. making an application UI friendly. In one or more embodiments, long operations (such as convolution-related accumulations) can be split into multiple steps, but certain embodiments may base the nature of the splits by evaluating the accuracy of the results, memory constraints, and effects on performance.

Using the CNN functionality as an example, the software implementing the convolution mathematics may be rewritten to split the accumulation in multiple steps, in order to limit the maximum execution time of each thread group, in accordance with the requirements of a given system. Thus, by knowing the N value in advance, the maximum execution (e.g., drain) time for N thread groups may be roughly limited to the GPU context switch time as discussed above.

In some embodiments, the amount and nature of operation partitioning is based upon two factors. The first factor is the number of outputs per thread. Generally, having more outputs per thread allows better execution performance and efficiency because the GPU registers can be loaded once for several outputs. However, if there are more outputs per thread, the absolute execution time for the thread becomes higher, which in turn increases the drain time for the queue. The second factor is the number of splits or divisions to the long continuous operation (e.g. the CNN-based accumulation). More splits or divisions results in less work per thread group, thus quicker time for draining the queue. However, more splits or divisions may also cause inaccuracy because memory constraints may only allow for intermediate accumulation buffers that are lower precision. One resolution for this issue, where constraints allow, is to allocate larger buffers for intermediate accumulation. Depending upon the embodiment, this may be accomplished in advance by understanding the system parameters, or on the fly by considering the system status and/or available memory.

Thus, some embodiments of the disclosure seek to optimize the number of divisions/splits by consideration of the foregoing factors. In one or more embodiments, the optimization is determined through empirical testing of the software and/or system.

Partitioning convolution mathematics may have other consequences that are remedied and accounted by some embodiments of the disclosure. One consequence of partitioning large operations, such as convolution mathematics, relates to increased memory usage. In order to mitigate this issue, some embodiments use the output texture itself as a temporary accumulation buffer.

Scheduler

As discussed above, in some embodiments of the disclosure, scheduling logic is provided. In one or more embodiments, the scheduling logic is employed to balance long continuous operations (e.g. accumulations associated with CNNs) with the demands of higher priority operations, such as user interface 3D graphics. Depending upon the embodiment, the scheduling logic may be implemented in hardware or software or a combination of both. In many embodiments, the scheduling logic is implemented in firmware and run on the GPU's microcontroller or another microcontroller associated with the GPU. In other embodiments, the scheduler is implemented in an O/S kernel driver and/or a user mode driver and run on a system CPU resource. Finally, in some embodiments, the scheduler is implemented partially in O/S kernel software and partially in microcontroller firmware.

For the remainder of the discussion, UI graphics will be used as the illustration for high priority operations and CNN-based accumulations will be used as the example for lower priority operations. Of course, the concepts discussed herein may apply to any higher and lower priority operations as subjectively chosen by the developer. Thus, in many embodiments, the UI graphics are prioritized so that visual disruptions to the display are either minimized (in some embodiments) or entirely prevented (in other embodiments). In addition, in many embodiments the designed balance between UI and accumulation compute operations also accounts for user expectations regarding the software associated with those compute operations. In particular, in one or more embodiments, CNNs (involving long compute operations) are used for photo analysis or virtual reality or augmented reality and some embodiments pursue a balance that assumed user expectations of responsiveness with those applications. For example, in the context of augmented reality, a developer might choose to increase the priority of identifying a building, perhaps even higher than dropping a few frames of motion of the building.

Figure 7:
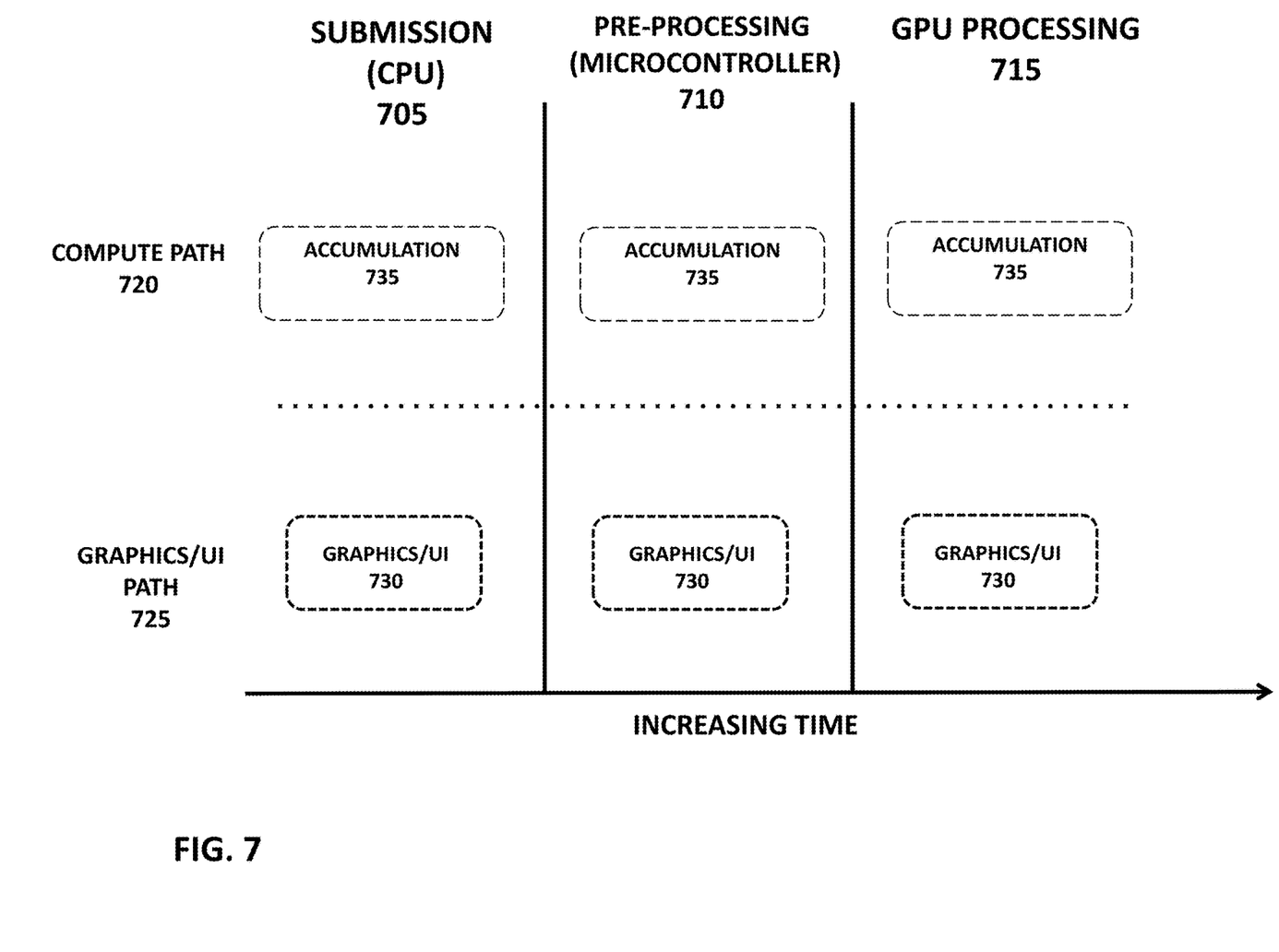
FIG. 7 shows a timing metaphor for compute and graphics pipelines in accordance with this disclosure.

With reference to FIG. 7, there is shown relevant stages of pipeline progress for compute path 720 and graphics/UI path 725, according to certain embodiments of the disclosure. In particular, each path has a submission stage 705 when the CPU submits the operation 735 if compute and 730 if UI. Each path also has a preprocessing stage 710 performed (in many embodiments) by a microcontroller as discussed above. Finally, depending upon the particular hardware configuration, each path has a GPU processing stage 715, which in some embodiments corresponds to the engine and queuing portions shown in FIG. 6.

Detecting

Figure 8A:
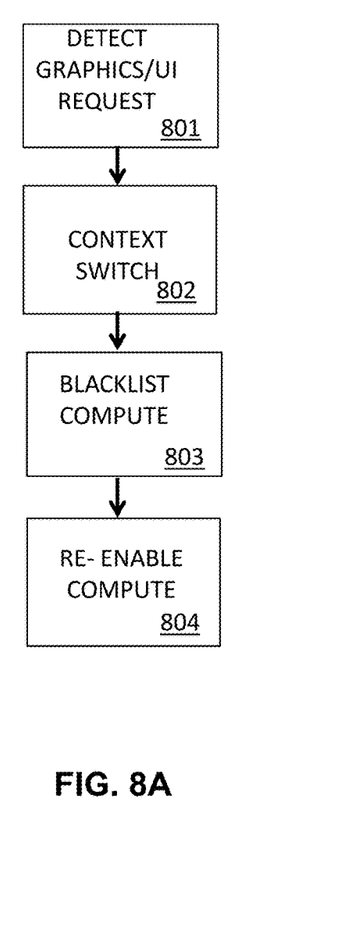
FIGS. 8A, 8B and 8C show processes associated with embodiments of the disclosure.

With reference now to FIG. 8A, there is shown a process associated with embodiments of the disclosure for performing scheduling. At 801, a UI/graphics request is detected. In one embodiment, the UI request may be detected at the pre-processing stage (e.g. 710 by the microcontroller). In an alternative embodiment, the UI request may be detected at the submission stage (e.g. 705 by the CPU). In either case, when the UI request is detected, a context switch request 802 is sent to the GPU to initiate a switch so that the UI operation may be performed timely. In some embodiments, while the context switch request 802 is being processed by the GPU, the pre-processing 710 of the UI request by the microcontroller is performed in overlapping time or simultaneously. This operation is very efficient because it overlaps the UI graphics (e.g. 3D) command pre-processing latency with the context switch overhead of the executing compute in the GPU.

In one embodiment, the detection includes an assumption that a lower priority compute is running when a UI graphics operation is received. Furthermore, this detection may be accomplished extremely efficiently by using a bloom filter for each processing node and each priority band.

Blacklisting

Blacklisting 803 is a technique employed by many embodiments to prevent the compute operations from regaining the GPU before a predictably sufficient amount of UI graphics have been processed. For example, since UI graphics requests (even associated with the same frame) may be temporally separated, the GPU might be switched back to compute immediately after only a small portion of graphics is processed. If a new UI graphics request arrives only a millisecond later, yet another context switch would be required to return to the higher priority UI work.

Thus, in some embodiments, either simultaneously or after context switch 802, a temporal blacklist 803 period is imposed upon compute operations to allow the UI graphics to execute without a truly concurrent compute pending. The temporal period for which compute operations should be blacklisted may be determined with empirical testing with observation (e.g., dependence) upon the typical submission rate of UI graphics and the typical dependencies between the UI graphics commands. In particular, UI graphics operations typically occur in batches, which facilitates characterization through empirical testing. In one embodiment, the blacklist period was determined to be 4 milliseconds. In one or more embodiments, the goal of the blacklist period is to allow an entire UI graphics frame to be processed during the blacklist period or, alternatively, prevent more than one context switch from occurring per frame of UI graphics processed.

Re-Enabling Compute

After the blacklist 803 period has been observed, compute operations may be re-enabled (804). In some embodiments, a blacklist timer is used and the timer may be reset during the re-enable processing. With reference to FIG. 8C, there is shown a more detailed process employed by some embodiments for re-enabling 804. At decision block 821, if low priority (e.g., compute) operations are not pending, then the logic loops to the beginning and repeats decision 821. If low priority (e.g., compute) operations are pending, the operation moves to decision block 822. At decision block 822, if high priority operations (e.g., UI graphics) are pending execution (e.g., have been detected and are not yet executing), then the logic loops to the beginning and repeats decision 821. If high priority operations (e.g., UI graphics) are not pending execution, then the logic moves to decision block 823. At decision block 823, if high priority operations (e.g., UI graphics) are executing, then the logic loops to the beginning and repeats decision 821. If high priority operations (e.g., UI graphics) are not executing, then the logic moves to action 824 and the low priority operations (e.g., compute) are re-enabled.

Combining Divided Compute Operations with Scheduling Logic

Figure 8B:
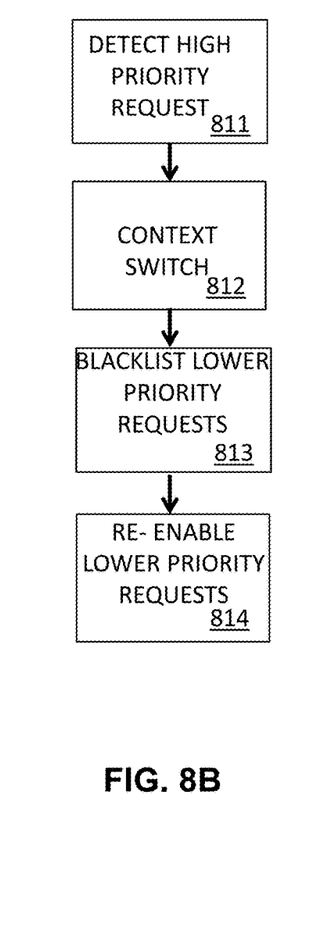
Figure 8C:
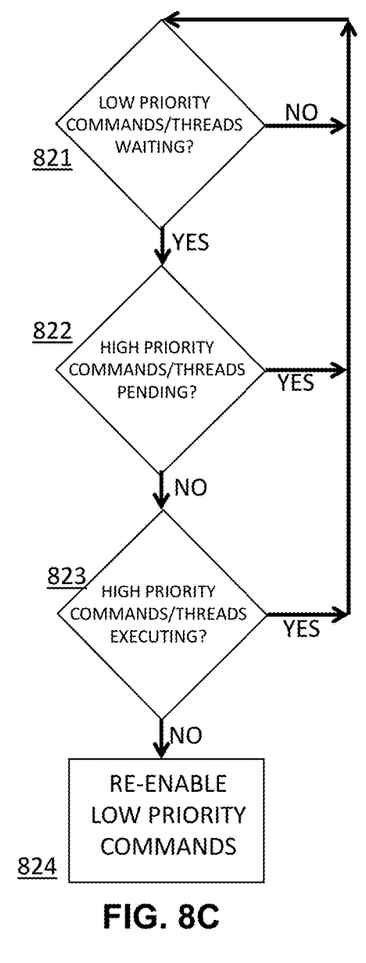

With reference to FIG. 8B, there is shown a process similar to FIG. 8A but illustrating that the techniques taught herein apply to any type of higher and lower priority operations for the GPU or even multiple GPUs.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention, therefore, should be determined with reference to the appended claims, along with the full scope of equivalents to which such claims are entitled. As used in this disclosure, (i) the words "include" and "including" and variations thereof, will not be deemed to be terms of limitation, but rather will be deemed to be followed by the words "without limitation," and (ii) unless the context otherwise requires, the word "or" is intended as an inclusive "or" and shall have the meaning equivalent to "and/or." Furthermore, in the appended claims, the terms "including" and "in which" are used as the plain-English equivalents of the respective terms "comprising" and "wherein."

The invention claimed is:

1. A method comprising:
dividing, by a processor executing a software program in user space, a convolution-related mathematical operation into a plurality of smaller operations;
receiving, by a graphics processing unit (GPU) driver program, the plurality of smaller operations for execution by a GPU;
populating at least a portion of a compute queue of the GPU with at least a portion of the smaller operations, wherein the populated portion of the compute queue must be drained prior to a context switch to a graphics operation, and wherein a number of the plurality of smaller operations are tuned so that the compute queue is drained during a period of time related to a latency of a GPU context switch;
beginning execution of one or more of the plurality of smaller operations by the GPU;
receiving, by the GPU driver program, a graphics operation associated with a user interface of a host system; and
executing the context switch on the GPU such that the graphics operation is executed after the populated portion of compute queue is drained.

2. The method of claim 1, further comprising blacklisting, in response to receiving the graphics operation, further compute operations for a pre-determined period of time after the populated portion of the compute queue is drained.

3. The method of claim 2, wherein the pre-determined period of time is determined through empirical testing and based upon submission rate of graphics operations associated with the user interface and satisfaction of dependencies between graphics operations associated with the user interface.

4. The method of claim 1, wherein the software program in user space comprises a user-facing application program.

5. The method of claim 1, wherein the software program in user space comprises a framework software program.

6. The method of claim 1, wherein at least a portion of the GPU driver program that receives the plurality of smaller operation executes on a microcontroller associated with the GPU.

7. A non-transitory program storage device comprising instructions stored thereon to cause one or more processors to:
receive a plurality of smaller operations corresponding to a convolution-related mathematical operation;
populate at least a portion of a compute queue of a graphics processing unit (GPU) with at least a portion of the smaller operations, wherein the populated portion of the compute queue must be drained prior to a context switch to a graphics operation, and wherein a number of the plurality of smaller operations are tuned so that the compute queue is drained during a period of time related to a latency of a GPU context switch;
begin execution of one or more of the plurality of smaller operations by the GPU;
receive a graphics operation associated with a user interface of a host system; and
execute the context switch on the GPU such that the graphics operation is executed after the populated portion of compute queue is drained.

8. The non-transitory program storage device of claim 7, further comprising instructions to cause the GPU to blacklist, in response to the received graphics operation, further compute operations for a pre-determined period of time after the populated portion of the compute queue is drained.

9. The non-transitory program storage device of claim 8, wherein the pre-determined period of time is determined through one or more empirical tests and based upon submission rate of graphics operations associated with the user interface and satisfaction of dependencies between graphics operations associated with the user interface.

10. The non-transitory program storage device of claim 7, wherein the instructions to receive a plurality of smaller operations comprise instructions to cause the one or more processors to receive the plurality of smaller operations from a user-facing application program executing in an application layer.

11. The non-transitory program storage device of claim 7, wherein the instructions to receive a plurality of smaller operations comprise instructions to cause the one or more processors to receive the plurality of smaller operations from a framework software program.

12. The non-transitory program storage device of claim 7, wherein at least a portion of a GPU driver program that receives the plurality of smaller operation executes on a microcontroller associated with the GPU.

13. A computer system, comprising:
a central processing unit (CPU);
a graphics processing unit (GPU); and
memory operatively coupled to the CPU and the GPU, the memory having stored therein instructions configured to cause the computer system, when executed, to:
 execute, by the CPU, a user space software program,
 divide, by the CPU executing the software program in user space, a convolution-related mathematical operation into a plurality of smaller operations,
 receive, by a GPU driver program, the plurality of smaller operations,
 populate at least a portion of a compute queue of the GPU with at least a portion of the smaller operations, wherein the populated portion of the compute queue must be drained prior to a context switch by the GPU to a graphics operation, and wherein a number of the plurality of smaller operations are tuned so that the compute queue is drained during a period of time related to a latency of a GPU context switch,
 begin execution of one or more of the plurality of smaller operations by the GPU,
 receive, by the GPU driver program, a graphics operation associated with a user interface of the user space software program, and
 execute the context switch on the GPU such that the graphics operation is executed after the populated portion of compute queue is drained.

14. The computer system of claim 13, further comprising instructions to cause the GPU to blacklist, in response to the received graphics operation, further compute operations for a pre-determined period of time after the populated portion of the compute queue is drained.

15. The computer system of claim 14, wherein the pre-determined period of time is determined through one or more empirical tests and based upon submission rate of graphics operations associated with the user interface and satisfaction of dependencies between graphics operations associated with the user interface.

16. The computer system of claim 13, wherein the instructions to receive a plurality of smaller operations comprise instructions to cause the GPU driver program to receive the plurality of smaller operations from a framework software program.

17. The computer system of claim 13, wherein at least a portion of the GPU driver program that receives the plurality of smaller operation executes on a microcontroller associated with the GPU.

* * * * *